United States Patent

[11] 3,586,875

[72] Inventor James P. Nicklas
Woodland Hills, Calif.

[21] Appl. No. 760,781
[22] Filed Sept. 19, 1968
[45] Patented June 22, 1971
[73] Assignee Electronic Arrays, Inc.
Woodland Hills, Calif.

[54] DYNAMIC SHIFT AND STORAGE REGISTER
3 Claims, 5 Drawing Figs.

[52] U.S. Cl. ........................................................ 307/221,
307/224, 307/238, 307/304, 328/37
[51] Int. Cl. ........................................................ G11c 19/00,
H03k 23/08
[50] Field of Search ........................................... 307/221,
224, 238, 279, 304, 303; 328/37

[56] References Cited

UNITED STATES PATENTS

| | | | |
|---|---|---|---|
| 3,395,292 | 7/1968 | Bogert .......................... | 307/221 |
| 3,406,346 | 10/1968 | Wanlass ........................ | 307/221 X |
| 3,431,433 | 3/1969 | Ball et al. ...................... | 307/221 |
| 3,483,400 | 12/1969 | Washizuka et al. ........... | 307/221 X |

*Primary Examiner*—Stanley D. Miller, Jr.
*Assistant Examiner*—John Zazworsky
*Attorney*—Smyth, Roston & Pavitt

ABSTRACT: A dynamic shift register, for example, of the large scale integrated circuit, MOS transistor-type, is described which can be operated as quasi-static register in that each bit circulates within the same stage by operation of separate clock operating for interstage shifting in the dynamic mode but inhibited during the static mode.

INVENTOR:
James P. Nicklas

By Smyth, Roston & Pavitt
ATTORNEYS

INVENTOR:
James P. Nicklas
By Smyth, Roston & Pavitt
ATTORNEYS

DYNAMIC SHIFT AND STORAGE REGISTER

The present invention relates to improvements for dynamically operated shift registers. Large scale integrated circuit techniques have led to the development of integrated circuits which hold large numbers of serially interconnected shift register stages. Each stage is responsive to two trains of interspaced clock pluses, all of them being applied concurrently to all stages of the register, whereby a pulse of one train as effective in a stage sets a particular state-defining signal from the respective preceding stage into the respective stage, and the next succeeding clock pulse of the other train shifts that signal through the stage so that the next clock pulse of the first train can again affect interstage signal transfer.

The shift register as a whole is constructed to have a plurality of input lines, which include essentially at least one input line for applying reference potential to the several stages. The input lines further include clock pulse lines, whereby operating potential and power may be applied to a stage through the application of the clock pulses. Additionally, there is one register stage which receives an externally provided data input signal, and there is another stage which provides signals to an output terminal of the shift register, which signals are representative of data being shifted out of the register.

The individual stages are constructed to have several points or regions within the integrated circuit chip, which are isolated from other stages and from the clock and reference terminals. These points or regions may hold potentials for a period of time without any significant leakage. In other words, they define capacitances, and the clock pulses, in effect, serve as sources for replenishing or changing such capacitance charges to be held until another clock pulse modifies the potential at that point. In addition, the clock pulses serve for controlling the transfer of charges or of potentials representative of such charges, between such normally isolated points. This way potentials and charges can propagate as signals between differently located, isolated points within the integrated circuit chip, and this is equivalent to the propagation of data bits through a register.

Large scale integrated circuit techniques of this type have made it possible to provide individual register stages at a cost which, at this point, tends to become a minute fraction of the cost of normal flip-flops used in the past as bistable storage devices for a shift register. A large-scale integrated circuit (or LC for short) shift register has the disadvantage that it can be operated dynamically only, i.e., it cannot hold data bits statically, but data bits are continuously shifted through the register. Each bit is held in any stage for a short period of time only, because each stage is not a bistable but only a monostable device. This is particularly so because the several isolated points within the integrated circuit chip cannot hold charges indefinitely long, so that the potential changes and signal levels are thus eradicated. Leakage currents tend to bleed off such charges.

Experience has shown that at the present time an LC shift register stage can hold a bit only for a small portion of a second. If an isolated point within the chip does not obtain a replenishing charge at least about once every 10 milliseconds or thereabouts, leakage current flow will destroy the existing charge to the extent that a subsequent attempt for replenishing a particular charge cannot duplicate the particular charge or potential previously held at that point.

It is the object of the present invention to modify a dynamically operated shift register to be capable of operating as a static register, i.e., to be capable of holding data bits without causing shifting of such bits through the register. In accordance with the principles of the present invention, it is suggested to provide temporary bit storing through recirculation or feedback in each individual stage, and to provide a separate clocking terminal in each stage for clocking the bit-storing feedback, i.e., for effecting bit recirculation involving that particular stage only, while the interstage bit transfer portion of the register is disabled. Therefore, the register will, in this case, receive three types of clock pulses, but for each mode of operation two only will be used.

For operating as a dynamic shift register the operation is the normal one in which the feedback circuit in each stage does not participate. In the hold or static mode (better, quasi-static mode) that feedback and recirculation control circuit in each stage receives a third clock signal as an exclusive alternative to the clock pulse normally causing the shift mode transfer through a stage towards the input of the next stage. In the hold mode, a bit is still transferred through each individual stage, but instead of causing it to be applied to the input of the next stage, it is being applied to the input of the stage itself. This way, in the hold mode, each bit is caused to circulate within each individual stage. The applied clock pulses replenish charges so as to maintain particular voltage levels and potentials in the several isolated points of any individual stage. These charges and potentials may have been established previously in the register in the shift mode.

From a different point of view, the invention can be practiced also to operate a single pair of substages in the hold mode as a quasi-bistable device, to apply at times a control potential to the input of one substage overriding the recirculation, while at still other times the recirculation is interrupted and a signal is withdrawn externally from the substage.

While the specification concludes with claims particularly pointing out and distinctly claiming the subject matter which is regarded as the invention, it is believed that the invention, the objects and features of the invention and further objects, features, and advantages thereof will be better understood from the following description taken in connection with the accompanying drawings, in which:

Figure 1:
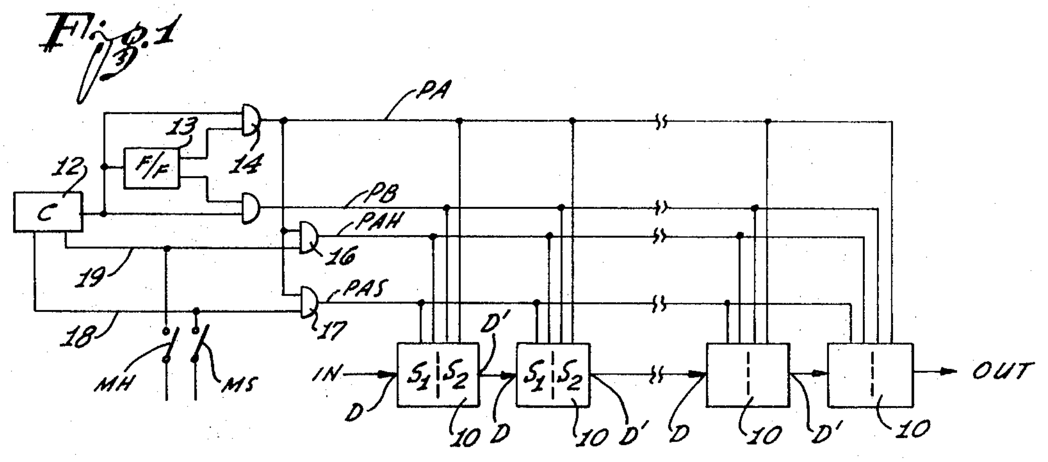
FIG. 1 illustrates schematically a block diagram of a shift register improved in accordance with the present invention, the illustration serves primarily to explain production of the several control signals applied externally to the several stages of the register.

Proceeding now to the detailed description of the drawings, in FIG. 1 thereof there is illustrated schematically the general layout of a dynamic shift and storage register in accordance with the present invention. The register is comprised of a plurality of stages, such as 10, having similar configuration; an example thereof will be described more fully below. Each stage 10 has an input terminal D and an output terminal D' connected to the input terminal D of the respective next stage. The register thus constituted by the plurality of stages 10 has a principal IN terminal and a principal OUT terminal respectively for receiving and providing of data bits. The number of stages in the register is immaterial for the purposes of the present invention, except, of course, that the register should have at least two stages.

The register has a plurality of input control lines for the providing of particular clock pulses to the several stages in parallel. These clock pulse lines are denoted with PA, PB, PAH and PAS. The register is operated from a master clock 12 providing the clock pulses at a particular rate. The clock pulses, first, operate a toggle flip-flop 13 providing alternatingly true signals at the respective set and reset output sides. A gate 14, for example, receives the set output side signal of toggle flip-flop 13 together with the clock pulses from source 12; a gate 15 receives the reset output signal of flip-flop 13 and also the clock pulses.

The output side of gate 14 is connected directly to register clocking line PA and the output of gate 15 is connected to clock line PB. Lines PA and PB receive clock pulses in alternating sequence, i.e., each line receives a pulse train and the pulses of the two trains are respectively interspaced. The pulse rate in each line is, of course, half the rate of clock pulses 12. In addition, the output pulses of the gate 14 are fed to a gate 16 which is enabled by a signal applied to gate 16 through a first mode switch MH when closed, so as to operate the register as a dynamic storage register. For this hold mode then, register clocking line PAH receives clock pulses which coincide with the pulses provided to the line PA. The second mode of operation is the shift mode, and for this mode a switch MS is closed to provide an enabling signal to a gate 17. The gate 17 receives additionally the clock pulses as provided by gate 14, and the output of gate 17 controls the line PAS, to provide clock pulses in precise synchronism with the pulses in line PA but for the shift mode only.

Switches MS and MH are never closed concurrently so that pulses coinciding with the mode independent clock pulses in line PA appear either in line PAH or in line PAS. It can be seen, moreover, that the pulses PA are also logically expressible as *PA=PAH+PAS*. Line PA does not have to be provided for if each individual register stage has circuitry to provide inside of the stage the *PAH+PAS* function. Pulses PB are mode independent.

The circuit operates as a shift register when switch MS is closed. By operation of the pulses in line PAS and of the pulses as alternating in lines PA and PB data bits will be shifted into, through and out of the register at the rate of the pulses in any individual clock line, which is half the rate of the clock pulses from source 12. In case the register must hold its content, switch MH is closed to operate the register as dynamic storage register. Clock pulses are still applied to lines PA and PB as in the shift mode but instead of line PAS, line PAH receives clock pulses coinciding with those in line PA. For reasons below, clock 12 may have a mode dependent frequency so that control lines 18 and 19 from the mode switches govern the clock accordingly. The selective operation in the hold and in the shift mode of each individual stage will now representatively be described with reference to FIG. 2.

Figure 2:
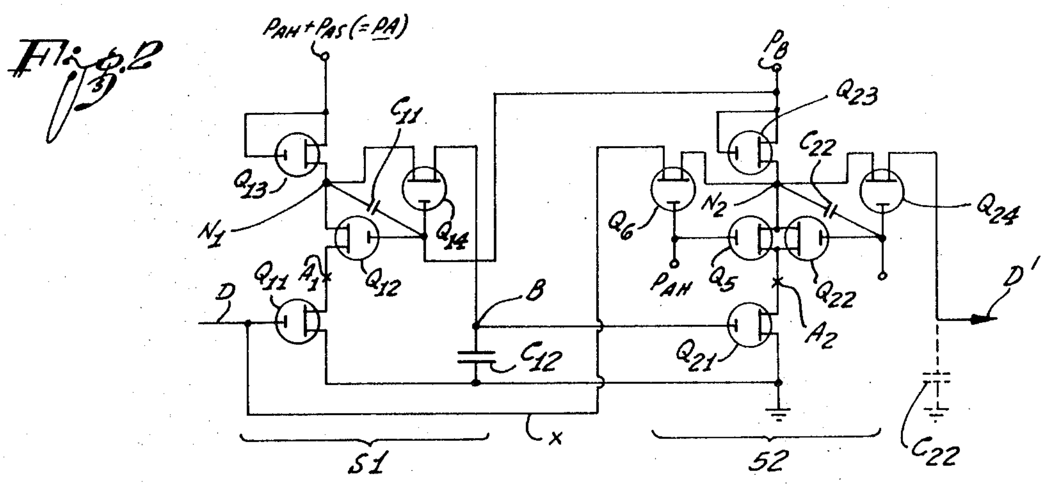
FIG. 2 shows a circuit diagram of an individual shift register stage in accordance with the preferred embodiment of the present invention.

FIG. 2 illustrates an example for a single stage 10. Such a single stage or storage cell is comprised of two portions S1 and S2. These two portions or substages are similar in that substage S2 has all of the circuit elements of substage S2 has addition elements to cause the stage to operate in the hold mode, so as to store a single bit for any period of time. Proceeding first to the description of substage S1, there is provided a data bit input transistor Q11 of the MOS type having its gate electrode serving as or connected to stage input terminal D. The two main electrodes of MOS transistor Q11 are connected respectively to ground and to the main electrode of another MOS transistor Q12 having its respective other main electrode connected to a main electrode of a third transistor Q13. The other main electrode of the latter transistor is connected to the line PA, receiving, as was described above, pulses of like designation. These pulses are logically expressible also as PAH+PAS to symbolize that they (1) occur in either mode and (2) coincide with mode dependent clock pulses, as the case may be.

The gate of transistor Q13 is connected to receive also the pulses PA. The junction between transistors Q11 and Q12 is denoted with reference numeral A1 for purposes of facilitating the description of the operation. The junction between transistors Q12 and Q13 is a current node N1 to which is connected one main electrode of a fourth MOS transistor Q14. The main electrode of transistor Q14 not connected to node N1 serves as output B of that first substage S1. Points or regions N1, B and A1 are particular regions within the integrated circuit chip, permitting isolation from any and all input terminals thereof, such as the clock lines and ground.

The two gates of transistors Q12 and Q14 are interconnected, and they both connect to clock pulse line PB to receive the clock pulses of like designation interspaced with the pulses PA. In view of the fact that the line PB is otherwise insulated from ground there exists a residual capacitance established by the two gate electrodes of the transistors Q12 and Q14 on one hand, and the current node N1 on the other hand. This capacitance is symbolically denoted with reference character C11.

The substage S1 is complete as described thus far. However, a portion of input MOS transistor Q21 for substage S2 can be regarded as pertaining to substage S1. Transistor Q21 of substage S2 is analogous to transistor Q11 of substage S1. The gate of transistor Q21 is connected to the one main electrode of transistor Q14 of substage S1 (point on terminal B). This gate, and therefore, point B, has a particular capacitance to ground and it is that capacitance which is needed as part of substage S1. One could, therefore, draw the dividing line between substages S1 and S2 through the transistor Q21 so as to include the gate electrode thereof to the stage S1.

Figure 3:
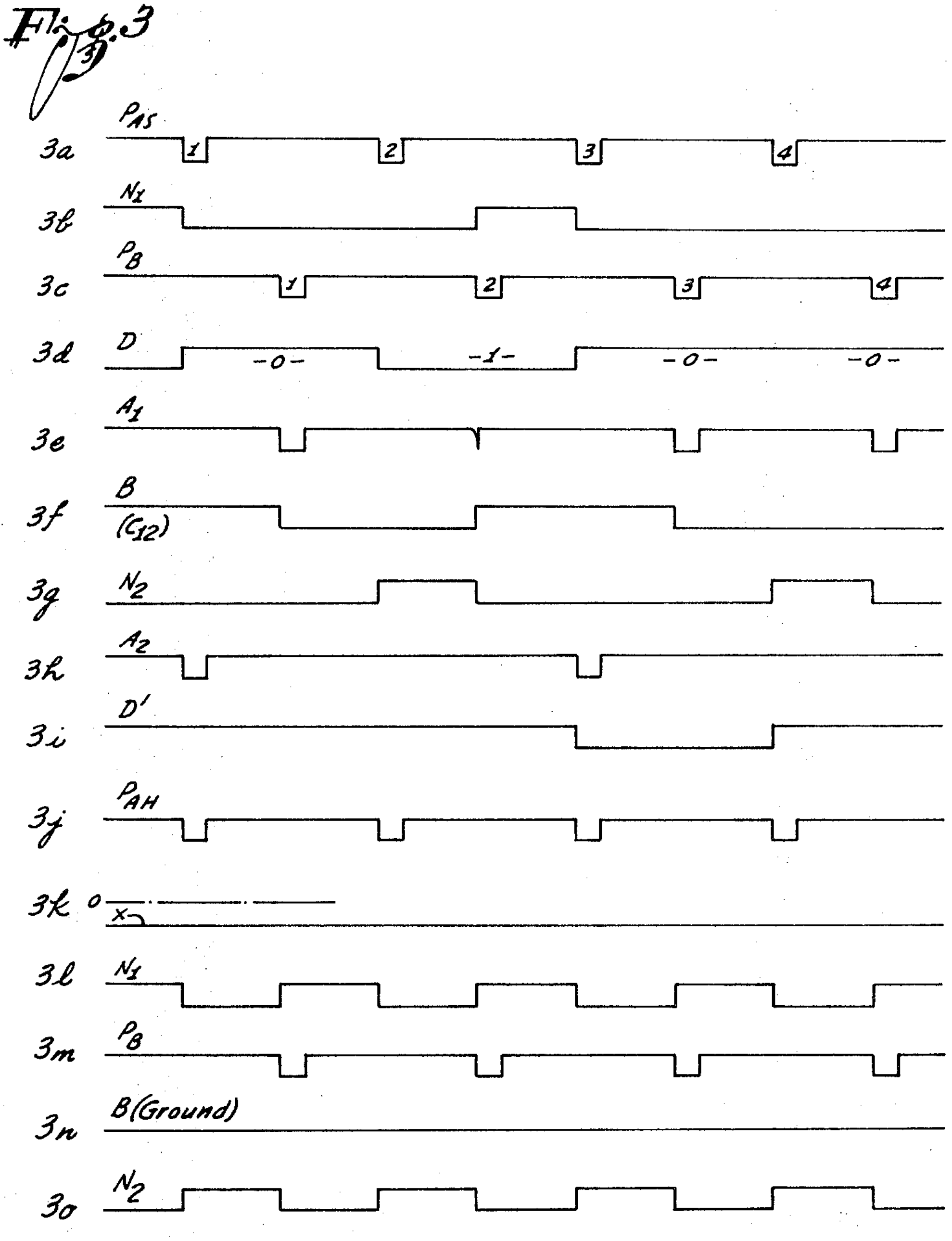
FIG. 3 is a timing diagram showing a plurality of pulses, voltages and signals in timed relationship and describing pulses and voltages as they occur in the circuit shown in FIG. 2.

It is advisable to describe first briefly the operation of substage S1. For this, reference is made particularly to FIG. 3 showing in line 3A the pulses PAS and in the line 3C the pulses PB. The pulses of each train, as far as they are illustrated in the drawings, are denoted with 1, 2, 3 and 4. A pulse is regarded as a negative going signal with respect to ground. Therefore, each pulse PAS operates to render transistor Q13 conductive, and upon being conductive the current node N1 goes likewise negative but to a value slightly less than the negative voltage applied to the line PAS as defining such a pulse PAS. As the control pulse for the transistor Q13 decays, line PA returns to ground potential, but the current node N1 remains negative as it is completely isolated from ground (FIG. *3*). Transistors Q11, Q12 and Q13 are nonconductive at this point.

The next pulse entering substage S1 is a pulse PB and it is assumed that this is pulse PB1. Further function now depends on the signal level prevailing in the input line D for the substage S1 (gate for transistor Q11). At first it shall be presumed that the line D is at ground potential equivalent to a binary "O" or a false signal applied to the particular register stage 10. This means that transistor Q11 cannot be rendered conductive through the data input signal. As the pulse PB1 appears transistor Q12 is rendered conductive and the potential at point A1 goes negative. This negative swing of the potential of point A1 is, in effect, the propagation of the potential at node N1, due to the negative charge of "capacitance" C11, through transistor Q12 to point A1. However, the "capacitance" C11 cannot discharge to ground, as transistor Q11 remains nonconductive. Thus, interconnected points A1 and N1 remain isolated from ground.

Transistor Q14 is likewise rendered conductive by PB1, and a negative signal is, therefore, applied to point B. This signal charges, in effect, the "capacitance" C12, so that upon decay of the pulse PB1 point B remains negative. The negative signal defining the pulse PB1 operates to restore and maintain a negative signal level at node point N1, provided N1 (and A1) remained isolated from ground. Therefore, as pulse PB1 decays, points N1 and B are approximately at similar negative signal levels and the isolation of those points from any external signal source causes them to maintain that potential.

It should be mentioned that actually point B could have been at a negative signal level already at the time transistor Q14 was rendered conductive. This will have been so if a previous data pulse was likewise a false signal equivalent to a binary "0." However, in the particular diagram plotted in FIG. 3 it is assumed that this was not the case, so that clock pulse PB1 shifts the potential of point B from ground to the negative signal level, i.e., from "false" to "true." Terminal B can be regarded as an output terminal of the substage S1 holding now an inverted data signal as applied at the pulse time PB1 through terminal D to the gate of transistor Q11, presently regarded to be a false signal equivalent to a binary "O. "

It is now presumed, in order to describe different operative states of and in the stage 10, that with the next pulse PAS which is pulse PAS2, data input line D changes signal level. For reasons which will become apparent later, data signals always change (if they change) at terminals D–D with the PAS pulses. Therefore, at PAS2 it is assumed that terminal D shifts to the negative level equivalent to a binary "1." This has no immediate effect upon substage S1 except that it charges the "capacitance"between the gating electrode of transistor Q11 and ground; transistor Q12 was rendered nonconductive again at the end of the previous pulse PB1 and remains nonconductive during PS2. At pulse PAS2, however, node N1 receives another negative signal, i.e., the "capacitance" C11 is recharged through transistor Q13. This replenishing of charge is the principal function of pulses PA for substage S1 in general. These pulses operate particularly as a periodic charge restorer for "capacitance" C11, as some of the charge thereof may have bled off by operation of pulse PB1 and after pulse PB1 decayed.

The next pulse in line PB is pulse PB2 and the following transpires. Transistor Q11 was rendered conductive through the signal in line D but does not conduct until the pulse PB2. The negative pulse PB2 renders transistor Q12 conductive so that now both transistors Q11 and Q12 are conductive, and immediately point N1 is clamped to ground as capacitance C11 discharges (see line 3*b*). Transistor Q14 is rendered conductive concurrently so that point B is clamped to ground likewise, discharging capacitance C12 (see line 3*f*). In other words, in case of a data binary "1" in line D, a pulse PB (here pulse PB2) has the effect of connecting point B directly to ground through transistors Q11, Q12, Q14 which are rendered conductive concurrently. As one can see from line 3*f*, the potential of terminal B goes to ground at PB2 commensurate with the inverting function as provided by the stage S1. The propagation of the inversion is delayed for a period of time in between a pulse PAS and the next pulse PB. In this particular case the binary "1" was applied to line D as a true signal, at pulse time PAS2; thereafter, that is inverted and delayed for the period between the pulses PAS2 and PB2 before appearing at point B at ground potential, i.e., as a "false" signal level. This delay is equal to a clock pulse period of the principal system clock 12.

The next pulse PAS which is pulse PAS3, causes "-capacitance" C11 to recharge and the point N1 receives negative potential again. Conductance of the transistors Q12 and Q14, of course, was limited to the pulse time for he particular pulse PB2 so that point N1 is again isolated from ground and capacitance C11 can, in effect, be charged and can also retain such charge. Other signal developments can be seen readily from FIG. 3*a* through 3*f*.

Proceeding now to the description of the stage S2 to the extent it participates in the shifting operation, it can readily be seen that the function of transistor Q21 is equivalent to the function of transistor Q11 of substage S1, and a particular signal level prevailing at the point B operates as "data" input for substage S2. More precisely, a data input for a register stage as operating as *data* input for substage S1 becomes a data input for substage S2. The function of transistors Q12 and Q14 is duplicated by the transistors Q22 and Q24 except that the gate terminals of transistors Q22 and Q24 receive pulses PAS only so that at this point a distinction between shifting and hold operation has to be made; these two gates receive only the shifting pulses PAS, not pulse PAH. Thus, these two transistors Q22 and Q24 do not participate in a hold operation which will be described later.

In an analogous manner then, transistor Q23 has a function essentially similar to the transistor Q13, but it receives the pulses PB as charge restorer of node N2. Therefore, as far as the transistors Q21, Q22, Q23 and Q24 are concerned, substage S2 operates also as a delay inverter but for the data signal as applied by stage S1 through its output terminal B and with a reversion as to response to pulses PAS and PB. The output terminal of the particular stage is D' which is connected to or established by the main electrode of transistor Q24 not connected to the current node N2 of substage S2. Due to the phase switch of substage S2 as far as processing of and response to pulses PB and PA (PAS) is concerned, the signal prevailing at terminal B is, therefore, delayed by another clock pulse period of the principal clock or for a period equal to the time between a pulse PB and the respective next pulse PA (PAS), whereby the data signal is again inverted. A signal at terminal D, therefore, propagates with the delay of a full pulse period PA (PAS) to output terminal D'. This verifies also the assumption made above that signal levels in lines D—D' change only at the time of occurrence of a pulse PA.

It will be appreciated that a signal register stage 10 can actually be interpreted as a series circuit of two stages (designated above as substages) each operating as an inverter and in phase opposition in relation to each other. One clock pulse (PB) inverts and shifts the input at terminal D through substage S1, i.e., into the stage; the next clock pulse PA inverts again and shifts the data signal through the substage S2, i.e., completes the through-shift through the stage. This latter shifting step applies the data bit to the next stage and thus operates as a direct, intrastage shifting step.

After having described the dynamic shift operation which in that manner is known, per se, we can now proceed to the description of the "hold" operation. It is apparent that proper function of the circuit depends on low discharge rates for the "capacitances,"such as C11, C12, C21 and C22. Each one of these "capacitances" must hold a pulse at least for a clock pulse period of the principle clock which is half the time of a clock pulse period of either of the pulses PA and PB. Integrated circuit registers have been operated down to frequencies of about 100 c.p.s., but for lower pulse rates the leakage discharge of these "capacitances" distorts operation. Thus, the circuit, as such, is not capable of operating as a static register.

For proper operation of the circuit as a static register it must be assumed that the input terminal D of any stage is at a floating potential as far as interstage connection is concerned. This can readily be verified by the circuit in FIG. 2 in connection with FIG. 1 as the principal input line D of a stage connects directly to the output line D' of the respective preceding stage. The output line D' of a stage is connected to one of the main electrodes of transistor Q24 thereof. During the hold mode, transistor Q24 is not rendered conductive as pulses PAS do not occur. Thus, line D' is never conductively connected to node N2 during the hold mode, so that line D', in effect, is at floating potential, which, in turn, means that the input line D of a stage is likewise at floating potential. In other words, D—D' are likewise isolated regions within the integrated circuit chip. It must be presumed, however, that the principal register input terminals IN and OUT are externally kept at floating potential during the hold mode (or do not participate in the static operation).

During the hold mode pulses PB occur as before, pulses PA occur, likewise in substage S1 as before, but in substage S2 pulses PAH occur instead of PAS. The stage S2 has two additional MOS transistors Q5 and Q6 for purposes of establishing hold mode operation. Each of these has a main electrode connected to the current node N2. Transistor Q5 is connected also in series with transistor Q21, so that, in effect, transistor Q5 has its two main electrodes directly connected to the two main electrodes of transistor Q22. Transistors Q5 and Q22, therefore, operate in a logic OR configuration, as far as control through signals PAH and PAS, are concerned. The one main electrode of transistor Q6 not connected to the current node N2 connects as a feedback line X to the gate of transistor Q11 at stage S1.

It will be apparent from the description of the circuit that the line X holds a signal equivalent to the signal applied during the previous PA clock pulse period to the gate of transistor Q11, which means that in the hold mode line X never changes signal level, and likewise line B does not change level but has the opposite logic signal level as has line X. This, in effect, means that a data bit is stored by double inversion and by causing it to recirculate through the two substages S1 and S2, whereby pulse PAH and PB serve as charge restorer to maintain the desired signal levels within the circuit. Actually, the term recirculation is not completely correct, as the data bit is stored in that the pulses PAH and PB periodically restore and thereby maintain particular signal levels in isolated regions X and B, whatever these signal levels were before the hold mode was established.

The restorative effect of the circuit, as far as the signal level in line X is concerned, can readily be seen from the following. Assuming that the line X is a negative signal level (FIG. 3*k*) corresponding to a binary "1" to be stored, then Q11 is conductive for each pulse PB, and node N1 is clamped to ground; point B, therefore, is also at ground level. Each pulse PA negative voltage in node N1, but transistor Q14 is not rendered conductive by PA so that ground remains at point B, transistor Q21 thus remains nonconductive. A pulse PAH renders transistors Q5 and Q6 conductive, but as Q21 is nonconductive, node N2 remains at the negative level to which it was clamped by a restorative operation during each of the pulses PB (FIG. 3*o*). Whenever Q6 is rendered conductive by a pulse PAH, the negative potential of N2 is applied to X. The capacitance between the gate of transistor Q11 and ground maintains X at the negative signal level which is the signal level to be maintained for a binary "1.""

A register, as shown in FIG. 1, can operate first as a shift register and it may be assumed, for example, that the register has M stages. Data bits are sequentially applied to the main input line IN for M–1 pulses PA (and PAS). After M–1 clock pulses PA, M–1 stages, counted from the next to last stage down to the first stage, hold M–1 data bits. An M*th* bit has not yet propagated into the shift register but is held at the line IN. For the next pulse PB, the M-data bits are shifted into the respective substages S1 of the M stages of the register. At that time mode switches MH and MS change position to terminate the shift mode and to establish the hold mode. With the next pulse PA there occurs a first pulse PAH instead of a pulse PAS. Therefore, each bit is set into the respective substages S2 and is fed back on the respective line X to the input of the respective substage S1. Subsequently then, each bit circulates through the respective stages S1 and S2 for as long as the hold mode prevails.

It will be appreciated that a register having such stages can also be designed to operate in the parallel shift mode, in which case terminals D are connected to external terminals, for providing data to the register and terminals D′ connected to external terminals for delivery of data from the register. A single pulse PB then clocks data into the register, a single pulse PAS shifts them out, and alternate trains PAH and PB store the bits. This, in turn, includes employment of a single stage. From a different point of view, a data transfer circuit constructed from cells such as 10 can be construed as sequence of isolated storage cells between which bits are transferred in the chosen sequence, whereby for each stage separate pairs of control pulses PAS and PB or PAH and PB are developed for selective storage and transfer, using additional gates, if desired, between different stages.

Figures 4, 5:
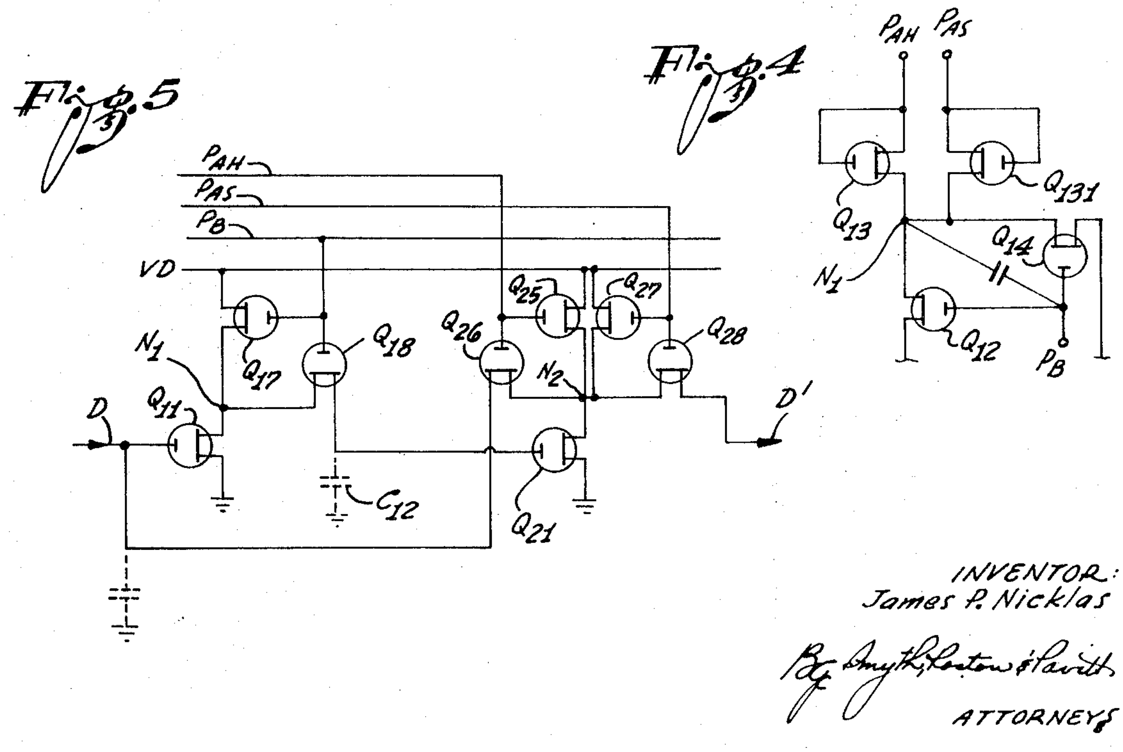
FIG. 4 is a circuit diagram illustrating a modification of a particular portion of the circuit shown in FIG. 2.
FIG. 5 illustrates a circuit diagram for an alternative embodiment of the present invention.

The circuit in FIG. 4 illustrates how each stage, particularly each substage S1, can be modified so that the register, as a whole, has only three instead of four input clock lines so that the input line PA can be eliminated from the register entirely. The current node N1 is connected through the transistor Q13 to the line PAH and an additional MOS transistor Q131 has likewise one main electrode connected to current node N1, and its gate and the other main electrode are connected to the line PAS. The two transistors Q13 and Q131 thus establish the logic OR function for the signals PAH and PAS. The remaining circuit for substages S1 and S2 is as aforedescribed.

The circuits shown in FIGS. 2 and 4 are very beneficial from the following standpoint: The power requirement for such a register is very low because there is never a direct path through a relatively low resistive element from any of the signal lines PA, PAH, PAS, PB, IN or OUT to ground through any of the stages. Transistors Q13, Q12 and Q11 and transistors Q23, Q21, Q22 or Q5 of any stage are never turned on at the same time. The several MOS transistors always transmit potential and charges only to and from node points such as N1, N2, B, etc., and any current flow within a stage involves charge or discharge of any of the capacitances C11, C12, etc. Such current flow from a clock line or to ground ceases when such a capacitance is, in fact, recharged or discharged, whatever the control requires. It follows, therefore, that the power dissipation of the system is proportional, to the shift rate because it depends on the number of charge-discharge cycles per second. This, in turn, leads to the description of the two lines 18 and 19 in FIG. 1, briefly mentioned above, and respectively leading from node switches MH and MS to the clock.

While different modifications are possible, the clock pulse source 12 may be constructed as a voltage controlled oscillator. The shift rate, i.e., the clock pulse frequency, usually will be rather high when the register operates as a shift register and as far as system requirements are concerned. Therefore, for the shift mode with mode switch MS closed, line 19 may control the oscillator 12 to operate at a rather high pulse or oscillation rate. On the other hand, for the hold mode, no particular speed requirement exists as far as the circulation of bits within each stage is concerned; the bits may "circulate" in each stage rather slowly, just fast enough to ensure proper signal restoration by the pulses to counteract any leakage. The power requirement of such register is proportional to the clocking rate and it is, therefore, beneficial, as far as power consumption is concerned, to operate the register in the hold mode at the lowest possible rate, leaving, of course, a considerable margin of safety so that the signal levels in the respective points X and B are sustained safely. A shift register may operate at clocking frequencies in the megacycle range; the hold register may operate in the kilocycle range. The power requirement will be reduced by a factor of $10^3$ or more for the hold mode as compared with the shift mode.

The embodiment illustrated in FIG. 5 is a modification of the circuit shown in FIG. 2. For reasons of analogy the MOS transistors Q11 and Q21 have been retained with that designation, respectively serving as data receiving elements in the substages of which each stage is comprised. This embodiment includes a particular input line VD applying permanently a negative voltage to one main electrode of a transistor Q17 of substage S1 and to one main electrode of a transistor Q27 of substage S2. Each of these transistors is respectively connected in series, as far as main electrodes are concerned, with the transistors Q11 and Q21. The resulting junctions operate as current nodes N1 and N2, and are respectively connected to a third transistor in each substage, which is transistor Q18 for S1 and Q28 for S2.

The other main electrode of transistor Q18 is connected to the gate of transistor Q21 whereas the other main electrode of transistor Q28 forms the output region or line D′ of the particular register stage. The signal lines PAS and PAH receive respectively clock pulses for the shift mode and for the hold mode, interspaced with the pulses PB provided in both modes as aforedescribed. Pulses PB control the gates of transistors Q17 and Q18 and pulses PAS control the gates of transistors Q27 and Q28 for shifting; pulses PAH control two additional transistors Q25 and Q26 for the hold mode. Transistor Q25 is connected between the current node N2 of substage S2 and the permanent voltage supply line VD. Transistor Q26 interconnects node N2 with the gate for transistor Q11 to provide a bit recirculation path.

Substage S1 operates in dependence upon the state of the signal in line D permitting or preventing current conduction of transistor Q11 during any pulse PB, when transistors Q17 and Q18 are opened, to apply either ground or negative voltage potential across "capacitance" C12. This, in turn, determines the bit level on an inverted basis during the shift mode, and the next pulse PAS opens the pair of transistors Q27, Q28 which reinvert again this pulse and apply the potential of current node N2 to output line D′ of the stage. In the hold mode the current node N2 is isolated from output line D′, and transistors Q25 and Q26 are rendered conductive to cause line D to assume a potential in accordance with the state of conduction of transistor Q21 as reflected in the potential at current node N2 at that time.

The particular circuit shown in FIG. 5 is somewhat simple but also less advantageous than the one shown in FIG. 2 or FIG. 4 because of higher power consumption. The embodiment described above with reference to FIG. 2 is, therefore, the preferred one; nevertheless, one can see that the principle employed with the present invention is applicable to other circuit configurations for dynamic shift registers.

The invention is not limited to the embodiments described above, but all changes and modifications thereof not constituting departures from the spirit and scope of the invention are intended to be covered by the following claims.

I claim:

1. A storage register operated through a power supply with source of reference potential and having a plurality of stages on an integrated circuit chip, the stages serially interconnected input-to-output as to adjacent stages, each stage including a pair of first and second substages, each substage having normally isolated input and output terminals, the first substage of a pair receiving at its input terminal as input signal the output of the respective preceding stage, and having its output terminal connected to the input terminal of the second substage of the pair, the second substage of the pair providing an output signal as input to the respective succeeding stage of the register, the improvement comprising:

means in each substage defining a node that is normally isolated from the remainder of the substage;

a clock terminal for each substage, for respectively and alternatingly receiving clock pulses for charging the nodes, the nodes of the two substages of a stage charged by alternating clock pulses;

means in each substage responding to the respective clock pulses interspaced with those charging the respective node of the substage for respectively transferring the input signal as received by the respective substage to the respective next substage at the time of a clock pulse the node of the next substage is charged, the substages being constructed in that their respective output terminals are capacitively isolated from each other and isolated from the path-supplying reference potential when clock pulses are not received by the substage, to hold the respective transferred signal;

first means connected for coupling the respective second substage of a stage of the plurality to the input terminal of the respective first substage to transfer a signal representing the input of the second substage and constituting the output thereof to the input of the first substage upon reception of particular hold clock pulses concurring with the clock pulses that charge the node of the first substage;

transistor means in each substage operated by the clock pulses in phase opposition to those charging the respective node and connected to the node for selective discharge in dependence upon the input signal effective at the input of the respective substage;

second means for coupling the output of the second substage of a stage of the plurality to the input of the first substage of the next stage;

means outside of the substages for selectively blocking the reception of the hold clock pulses; and means for applying shift clock pulses to the second means for coupling, the shift clock pulses concurring with those controlling the selective discharge of the node of the second substage as being interspaced with the clock pulses as provided to the clock terminal of the first substage, to effect the transfer of the signal representing the input of the second stage to the input of the first substage of the next stage.

2. In integrated circuit register comprising:

pluralities of first, second, third and fourth regions, isolated from each other by adjoining regions and each having capacitance relative to the respectively adjoining regions, not pertaining to the pluralities;

first switching means respectively interconnecting in pairs one of the first and one of the second regions each and concurrently in response to pulses of a first train;

second switching means respectively connecting in pairs and concurrently one of the third and one of the fourth regions in response to pulses of a second train;

third switching means respectively connecting in different pairs from the connections of the second switching means one of the third and one of the fourth regions in response to pulses of a third train;

fourth switching means for permitting coupling of the first regions to potential of a substrate in the integrated circuit only respectively during pulses of the second or third train;

fifth switching means included in the second switching means for permitting coupling of the second regions to potential of the substrate in the integrated circuit only respectively during pulses of the first train;

first means connected for periodically, alternatingly restoring capacitive charges of the plurality of first and third regions in synchronism respectively with pulses of the second or third and of the first train;

second means including the fifths switching means and connected to be responsive to the pulses of the second or third train for controlling the capacitive charges of each of the third regions respectively in dependence upon the level of charges of the second regions in particular association of each of the third regions of the plurality with a second region of the plurality;

third means including the fourth switching means connected to be responsive to the pulses of the first train for controlling the maintaining or removal of capacitive charges of each of the first regions in dependence upon the respective ones of the fourth regions being at times respectively connected to one of the third regions by operation of a second train pulse, the respective latter third region being associated with a second region by operation of the second means, and the second switching means which second region is associated with the first region by operation of the first switching means;

means also including the fourth switching means and connected to be responsive to the pulses of the third train for controlling the capacitance charges of each of the first regions in dependence upon the respective ones of the fourth regions being at times respectively connected to one of the third regions by operation of a third train pulse; and means for controlling production of the first, second and third trains for providing alternating interspaced sequences of the first and second trains or of the first and third trains.

3. A register with integrated circuit bit storage locations comprising;

first means defining a source of data bits;

second means providing an alternating sequence of first and second phase signals;

third means for providing shift phase signals concurring with the first phase signals;

fourth means for providing hold phase signals concurring with the first phase signals;

fifths means connected for enabling one of the third or the fourth means so that only shift or hold phase signals are provided, thereby establishing the shift or quasi-static mode respectively;

a plurality of bit storage stages, each having input and output terminals, the stages connected serially to each other, the output of one to the input of the next one, the first one having its input connected to the first means;

each bit storage stage having first and second substages and respective first substage having first transistor means and second, third and fourth field effect transistors of similar type, each having two main electrodes and a gate, the first transistor means connected with one main electrode to a first node to charge the node in response to the first phase signals applied to the gate, the second transistor connected with one main electrode to ground, the third transistor connected with its main electrodes between the node and the other main electrode of the second transistor, the gate of the second transistor defining the input of the stage;

the second substage having fifths transistor means, sixth, seventh and eighth transistors, each having two main electrodes and gate, and ninth transistor means, all of similar type, the fifth transistor means connected to a second node to charge the node in response to each second phase signal, the sixth transistor having one main electrode connected to ground, the fourth transistor of the first substage connecting with its main electrodes the first node to the gate of the sixth transistor, the gate of the fourth transistor connected to the second means to receive therefrom the second phase signals only, the seventh transistor connected with its two main electrodes between the second node and the gate of the second transistor, and having its gate connected to the fourth means to receive therefrom hold phase signals when provided, to couple the second node to the gate of the second transistor in synchronism therewith, the eighth transistor having one main electrode connected to the third means to receive therefrom shift phase signals when provided, the other main electrode defining the output terminal of the stage, the ninth transistor means connecting the second node to the other main electrode of the sixth transistor and having gate means connected for control in synchronism with the first phase pulses.